United States Patent
Zoot et al.

[15] 3,679,307
[45] July 25, 1972

[54] NON-CONTACTING OPTICAL PROBE

[72] Inventors: Robert Martin Zoot, Los Angeles; James Leo Scieszinski, Canoga Park, both of Calif.

[73] Assignee: ATI, Inc.

[22] Filed: Feb. 19, 1970

[21] Appl. No.: 12,575

[52] U.S. Cl. ...................................356/4, 356/1, 356/2, 250/208, 250/209, 250/211
[51] Int. Cl. ......................................................G01c 3/08
[58] Field of Search..................356/1, 2, 4, 5, 120, 123, 167, 356/141, 152; 250/211, 203, 208, 209

[56] References Cited

UNITED STATES PATENTS

| | | | |
|---|---|---|---|
| 3,202,820 | 8/1965 | Norton et al. | 250/211 |
| 3,054,898 | 9/1962 | Westover et al. | 356/4 |
| 3,076,378 | 2/1963 | Biedermann et al. | 250/217 |
| 3,473,875 | 10/1969 | Bertram | 56/2 |
| 3,481,672 | 12/1969 | Zoot | 356/5 |
| 3,076,949 | 2/1963 | Anderson | 250/211 |

FOREIGN PATENTS OR APPLICATIONS 728,860   3/1966   Canada.........................356/1

OTHER PUBLICATIONS

Beck et al., "Surface Analysis," IBM Tech. Disclosure Bulletin, 5-1970, Vol. 12, No. 12, pp. 2,335-2,337

*Primary Examiner*—Rodney D. Bennett, Jr.
*Assistant Examiner*—S. C. Buczinski
*Attorney*—Henry M. Bissell

[57] ABSTRACT

A distance measuring device for deriving contour information without contacting the surface being measured and without the use of internal moving parts. The device utilizes an optical system and geometric triangulation techniques to develop electrical output signals which may be used to drive readout displays and numerically controlled machine tools or the like. One embodiment of the device includes a specially configured photo detector which compensates for certain ranging errors encountered in previously known devices. Data processing electronics are provided for a variety of operations and applications. A particular feedback light control system is employed to compensate for variations in reflected light levels.

42 Claims, 8 Drawing Figures

PATENTED JUL 25 1972 3,679,307

INVENTORS
ROBERT M. ZOOT
JAMES L. SCIESZINSKI
BY Henry M. Bissell
ATTORNEY

NON-CONTACTING OPTICAL PROBE

BACKGROUND OF THE INVENTION

1. Field of the Invention

This invention relates to contour reading systems, and more particularly, to such a system utilizing an optical detector which does not require contact with the surface being read.

2. Description of the Prior Art such as numerically

For a variety of uses, it is often desirable to be able to convert a given surface contour, which may be visually apparent, to a quantitative readout in the form of signals which may be stored in a computer and used in various processes under computer control or retrieved for later study and comparison. With the advent of such sophisticated systems subject to computer control, such as numerically controlled machine tools, computer controlled graphical plotters and the like, the development of production line tooling has been greatly facilitated. However, the full capabilities of such systems have been restricted by limitations arising from the manner in which a given model can be reduced to quantitative information for computer storage. Where a particular model does not particularly comprise systematically defined surfaces, but instead comprises more or less randomly disposed points making up the surface contour, as for example in the case of a human model (the clothing field) or a design model which is to be mass produced in large quantities (e.g., the auto industry), the task of mapping the surface contours in a manner which permits ready reproducibility has not been satisfactorily solved heretofore. Attempts at a solution to the problem include a system known as an electronic surface recorder which has been employed in the auto industry to take contour information directly off the full size clay models which represent the design that is selected for production. One drawback with this system, however, has been the fact that it requires water on the surface of the clay model as a medium between the probe and the clay. This is somewhat messy and also may cause bulging or distortion of the model. Other contour recorders have required physical contact between the surface detector and the model with a possible undesirable interaction between the detector and the surface being measured. Another type of system employed a laser beam in a relatively cumbersome arrangement including a number of moving parts requiring critical adjustment and frequent maintenance in operation. Still another known system has relied on beam-splitting techniques with null balancing of the separated light channels. None has resulted in a workable system which is entirely satisfactory for the purpose. A workable non-contacting probe is perhaps the last element needed to be developed in order to perfect the complete automation of developing the production line tooling from a design model.

SUMMARY OF THE INVENTION

In brief, arrangements in accordance with the present invention comprise an optical system which operates to translate mechanical distance or motion into signals representing digital dimensions, by means of triangulation. A light source is focused onto a target from which dimensions are to be taken. Reflected light is collected by a receiver system which filters (if need be) and converges the light onto a silicon detector. The silicon detector is located off the focal point for systems where a wide dynamic range is desired, although for certain uses it may be positioned at the focal point. A particular bicell configuration is employed for the silicon detector so as to develop the capability of locating the center of the defocused light spot. At the zero position for the system probe, the spot center is located at the center of the bicell detector. Translation from the zero position is then measured linearly in accordance with changes in the light pattern at the detector. Associated electronic circuitry amplifies and processes the output from the silicon bicell detector to provide suitable degitized output signals in a preferred arrangement. However, if desired, analog signals may be developed.

One particular arrangement in accordance with the present invention utilizes a light source comprising an incandescent lamp within a light-tight box having a pin-hole aperture. Other more sophisticated focusing systems may be employed if desired. The light source is placed along the projection optical axis. A projectionlens collects the radiated light from the light source and focuses it at the zero-setting position of the target. The "stand-off" distance (the distance between a reference point of the probe and the target zero position) can be varied over a considerably range through the selection of lens and component orientation. Light is reflected along a receiver optical axis oriented at an angle to the projection optical axis. This light is gathered into a light-tight box by a receiver lens and passed through an optional optical filter, if appropriate, for imaging on a silicon bicell photo detector. Such silicon photo detector bicells are known in the art and are available from United Detector Technology, Santa Monica, Calf., among others. One type of bicell comprises a photovoltaic surface divided into two sections with electrical leads connected thereto. In this manner the bicell is enabled to provide a comparison of the light imaged on its two sections. Alternatively, a photoconductor bicell may be used, although the photovoltaic type offers better linearity. A photo-emissive bicell is also suitable.

Translatory motion of the target either toward or away from the transmitter lens results in motion of the received spot across the bicell. A signal proportional to the motion is thus generated when the bicell outputs are differenced. Inherent scale factor changes due to variations in target material, target angle, and target motion are automatically compensated for in the associated data processing electronics unit. Various light sources may be employed in the optical probe of the present invention. However, an incandescent light source utilizing a pin hole to obtain an acceptably small spot size performs satisfactorily in most applications. This light source preferably utilizes subminiature incandescent lamps of less than one watt power consumption, thus eliminating any need for cooling by virtue of the low power level involved and the relative insensitivity of the incandescent lamp to ambient temperature. In accordance with an aspect of the invention, the intensity of the lamp may be varied depending upon the surface characteristics of the target and other related factors. If the spot size from the pin hole light source is larger than desired, cross hairs may be added at the pin hole to mark the optical center of the measurement spot.

In one particular arrangement in accordance with the invention, the incandescent light source is operated at a lower than normal voltage, and narrow band optical filtering is employed in the light receiver to eliminate associated background noise, thus admitting the reflected radiation from the light source while blocking out ambient light which might otherwise interfere with the true signal developed by the detector.

In particular arrangements in accordance with the invention, the optical probe may be positioned on a traversing system including a table or mount which is controlled in space relative to a model or other contour surface which is to be mapped. Typically, the probe is oriented so that its projection axis is aligned with the Z coordinate axis. Variable electrical output signals are developed in accordance with variations in the distance between the probe and the target. Motion of the table in the X and Y directions with recording of the X and Y movements together with the output signals from the probe provide a contour of the target surface in a form which may be stored by a computer or utilized to drive a printer, a drafting machine, a numerically controlled machine tool or the like. Alternatively, the probe may drive a servomechanism controlling the Z position with an electromechanical readout of the Z coordinate. A null indicator and deadband light may also be included for operating information.

In the use of systems in accordance with the invention which employ conventional photo diode bicells, it has been found that there is a certain inherent error which develops from a misinterpretation by the detector of an intensity gradient component in the reflected light. Because of this effect, the detector provides a signal indicating a deviation from the actual distance to the target. In accordance with a particular aspect of the invention, this inherent error has been eliminated by the development of a dual bicell comprising four distinct photo detector segments which are arrayed in a particular configuration and interconnected by pairs, the second pair providing a compensating signal to cancel the error introduced by the reading from the first pair.

In accordance with an aspect of the invention, one particular arrangement thereof utilizes a feedback control system for the light source, providing a path from the signal output portion of the circuit to derive an electrical signal which is applied to a difference amplifier for comparison with a reference signal level. The output of the comparison stage is applied to the light source in a manner which varies the intensity thereof in accordance with certain variations in signal from the detector, thus compensating for variations in light intensity due to differences from one lamp to the next and changes in the light output with age, as well as for variations in the reflected light due to changes in the reflective properties of the surface being mapped.

Systems embodying the present invention have a wide variety of potential uses. In the automobile industry years of work are typically required before a complete new body style can be mass produced. Much of this time is consumed in taking measurements necessary to prepare templates or tooling which conform to a design model. With the present invention, the necessary data for an entire car body can be obtained in a matter of days. Similar improvements can be realized in the measurement of shoe lasts, and the production of aircraft, ships and other vehicles. The invention may be similarly used in the mannequin and apparel industry to take three-dimensional measurements from human models of different sizes and in different positions, not only saving considerable tedious time-consuming work, but permitting complete automation of the entire process from the model to the finished product. The present invention, combined with computer control, presents the capability of not only developing a pattern from a model but providing the entire system of graded patterns at one time. Face and body contours of human beings may be conveniently reduced to numerical form for comparison by computer for rapid identification, similar to the manner in which fingerprint identification is currently achieved.

The present invention permits the accurate measurement of objects which cannot be physically contacted for that purpose. In wind tunnel tests, for example, any intrusion of deflection measuring devices often significantly alters the conditions under which the measurements are made. The present invention permits the surface contour of the wind tunnel model to be continually monitored from outside the wind tunnel to provide a record of dimensional instabilities and deviations occurring just before the model disintegrates.

The present invention provides the capability of monitoring wear on precision bearing surfaces, even while the bearings are in operating use. This is, of course, accomplished without any interference of the operation of the equipment. Thus, such a system may provide an indication of potential failure before the equipment reaches the failure point. Similarly, systems equipped with the present invention may be employed for quality control inspection on production lines, literally permitting 100% inspection "on the fly" without having to pull products off the line for spot checking and other tests.

Although the present invention is applicable to a variety of uses, of which the above examples are only a small sample, it will be shown and described herein in accordance with its application in the automotive design field. However, it should be understood that it is not to be limited thereto.

BRIEF DESCRIPTION OF THE DRAWINGS

A better understanding of the present invention may be had from a consideration of the following detailed description, taken in conjunction with the accompanying drawings, in which.

DESCRIPTION OF THE PREFERRED EMBODIMENTS

Figures 1, 2:
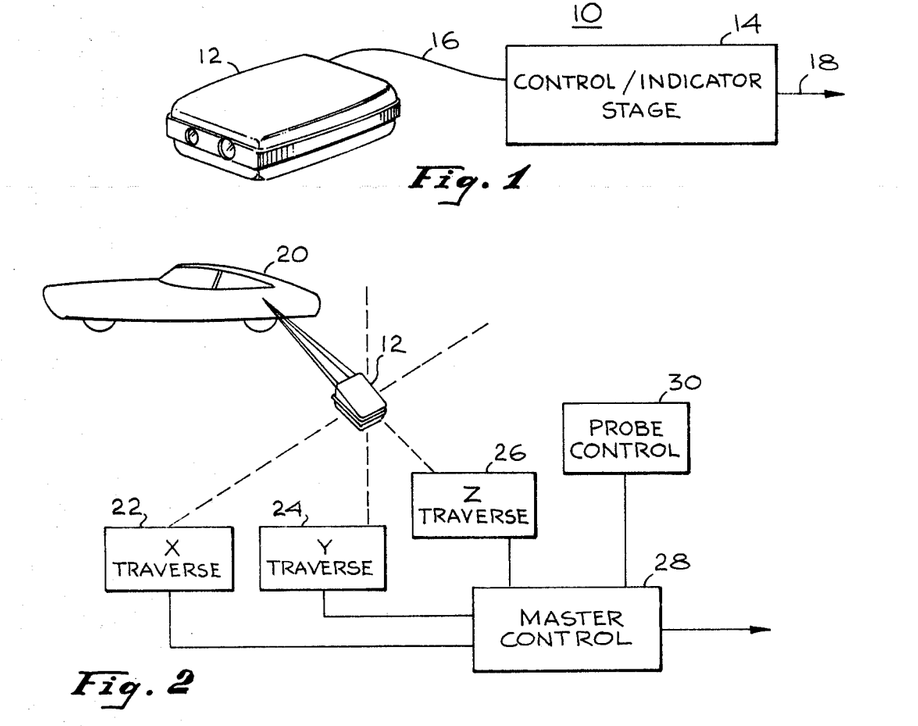
FIG. 1 is a diagrammatic representation of one particular arrangement in accordance with the invention.
FIG. 2 is a block diagram illustrating the use of the arrangement of FIG. 1 in one particular application.

FIG. 1 illustrates one particular arrangement in accordance with the invention comprising a probe or head 12 and a control/indicator stage 14. The two portions are connected by a suitable electrical cable 16 and the control/indicator stage 14 provides an output on a lead 18, which may indicate a plurality of output leads together. The stage 14 may also include an indicator calibrated in feet or inches for providing a direct reading of distance from the probe 12 to the target.

FIG. 2 illustrates one particular system in which the arrangement of FIG. 1 may be employed, and shows the probe 12 set up in a control system to scan a particular target in the form of an automobile design 20. In this particular application, it is contemplated that the movement of the probe 12 is controlled along three Cartesian coordinate axes by means of an X-traverse stage 22, a Y-traverse stage 24 and a Z-traverse stage 26, all coupled to a master control stage 28. In a preferred arrangement of this type, as the traverse stages 22, 24 and 26 determine the movement of the probe 12 in its scan of the model 20, the position signals are transmitted to the master control stage 28, along with output signals from the probe 12 derived via a probe control stage 30. The master control stage 28 provides an output which is in a numerical form suitable for storage in a computer or for control of automatic machines. The probe control stage 30 may comprise the control/indicator 14 as in FIG. 1, or it may be of a more sophisticated design for controlling the probe 12 during its traverse in the scanning process.

Figure 3:
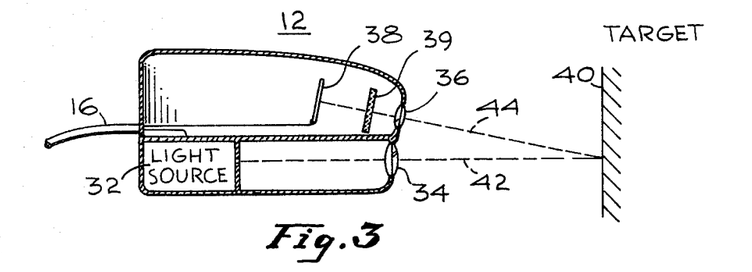
FIG. 3 is a sectional view of a portion of the arrangement of FIG. 1.

One particular construction of the probe 12 is shown in the sectional view of FIG. 3 as comprising a light source 32, a projection lens 34, a receiver lens 36, and a photodetector 38. The entire enclosure, including the partition between the projector and receiver portions of the probe 12, is of course light-tight except for the lenses 34 and 36. In addition to those elements which have been mentioned, the receiver portion of the probe 12 may also include a light filter 39 between the receiver lens 36 and the photo detector 38.

In operation, the probe 12 is placed opposite a target 40. The operation of the probe 12 is based upon triangulation. The light source 32 is utilized to form a small intense spot of light for projection. The light source 32 is placed along the projection optical axis represented by the dashed line 42 and is normally positioned so that the projection optical axis 42 is normal to the target 40, or at least is normal to some particular reference plane thereof for the zero angle position. The projection lens 34 collects the radiated light of the light source 32 and focuses it at the zero setting position of the target 40. Reflected light, directed along the received light axis represented by the dashed line 44, is gathered by the receiver lens 36 and is then directed toward a bicell photo detector 38, through an optional filter 39 if the latter is included. When used, the filter 39 serves to inhibit ambient light from reaching the detector 38. In the arrangements shown in FIG. 3, the filter 39 would typically be a high-pass filter when the light source 32 comprises an incandescent bulb or an arc light, whereas it is preferably a band pass filter when the light source 32 comprises a laser beam source. The bicell detector 38 is mounted with its center position being on the receiver optical axis 44.

Translatory motion of the target relative to the projection lens 44 results in motion of the received spot across the bicell detector 38. A signal proportional to the motion is thus generated when the bicell outputs are differenced. Inherent scale factor changes due to variations in the target material, target angle and target motion are automatically compensated for in associated data processing electronic circuitry of the control/indicator stage 14. Thus, the probe 12 and its related circuitry are usable over a wide range of target materials, including paper, cardboard, wood, plaster, clay, painted surfaces, plastic, metals, and the like which present both a wide variation in material and in surface roughness. The only requirement is that the surface be at least partially optically diffuse in nature. Materials of relatively high specular quality can be measured directly over an incident angle of a 90° solid cone centered on the projection optical axis. This includes materials which vary by as much as 30:1 over the indicated angular range.

The principal variable in the configuration of the sensor probe 12 as shown in FIG. 3 is the light source 32. This may assume several forms dependent upon the specified probe size and weight, and the specified projected spot diameter. The light source 32 can consist of a gaseous or a semiconductor laser, for example, a zirconium concentrated arc lamp, or an incandescent lamp and pinhole. A laser light source results in the smallest spot size and permits detection and/or measurement of surface irregularities. The laser may be utilized without a lens when an increased spot size is permissible. A zirconium concentrated arc lamp yields an acceptably small spot size for most measurement applications other than investigation of surface irregularities. An incandescent bulb radiates from too large an area but projecting the light from an incandescent bulb through a pinhole provides an acceptably small spot size which is satisfactory in most applications. Where desired, cross hairs may be added at the pinhole to mark the optical center of the measurement spot.

Figure 4:
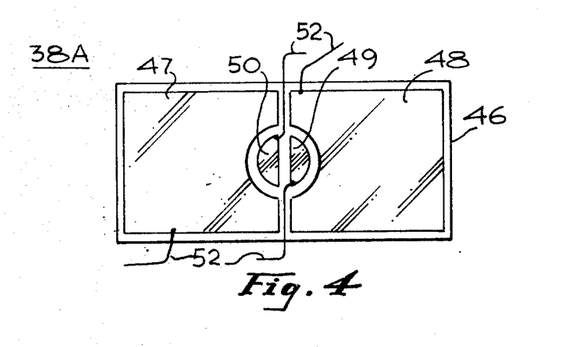
FIG. 4 is a diagram representing one particular device in accordance with an aspect of the invention which is employed in the apparatus of FIG. 3.
Figure 5:
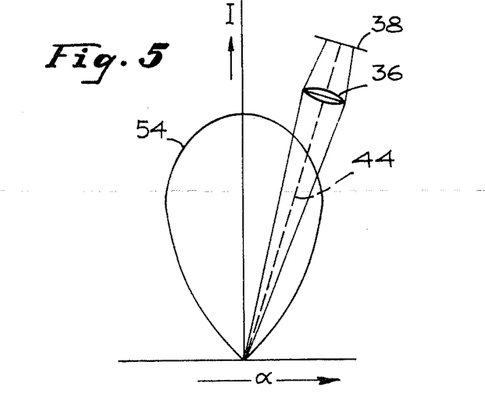
FIG. 5 is a graphical representation with a lens and target system superimposed thereon for illustrating the operation of the device of FIG. 4.

FIG. 4 illustrates one particular configuration of a photodetector 38 in accordance with an aspect of the invention. The photodetector 38A of FIG. 4 is represented as comprising a backing strip or substrate 46 on which are deposited a pair of relatively large-sized photoconducting films 47 and 48 and another pair of relatively small-sized photoconducting films 49 and 50 positioned in the center of an aperture in the larger films 47 and 48. Suitable conducting leads 52 provide electrical connections to each of the individual films 47–50 and to the substrate 46. The electrical signals derived via the leads 52 from the action of light on the detector 38A are applied to suitable electronic circuitry for data processing. Before describing such circuitry, however, it may be helpful in understanding the systems in accordance with the invention to explain the effect of light on a bicell photodetector by reference to FIGS. 5 and 6. FIG. 5 is in part a graphical plot of light intensity, I, versus the angle of deflection, α. The lobe 54 is such a plot for a given light intensity projected from a given source along an axis normal to a target of a particular material. Superimposed on the plot of FIG. 5 is a portion of the receiver system of the present invention comprising the receiver lens 36 and a bicell detector 38. When the probe 12 "looks" at the target at the reflection angle shown (the angle between the received light axis 44 and the vertical) a certain inherent error is encountered. As indicated in FIG. 5 the system "looks" at a cone of light centered on the axis 44. This inherent error results from the gradient in light intensity which is encountered over the extent of the conic section intersected by the lobe plot 54.

Figure 6:
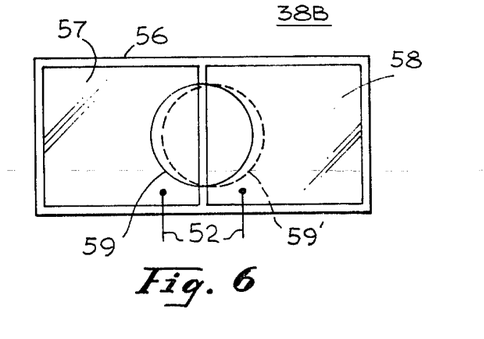
FIG. 6 is a representation of a device similar to that of FIG. 4 but presently available in the prior art.

A conventional bicell photodetector is shown in FIG. 6 in the form 38B comprising a pair of photo diode films 57 and 58 on a substrate 56 with electrical conducting leads 52. When such a bicell 38B is utilized in the system of FIG. 5, the left-hand film 57 receives light of greater intensity than the light which is incident upon the right-hand film 58. Thus, although the spot of light represented by the circle 59 may be accurately centered upon the bicell 38B, the difference in light intensity results in a difference in the amplitude of the signals on the two leads 52 connected to the films 57 and 58 respectively, with the result that the bicell 38B provides a readout signal as through the light spot 59 were shifted to the position represented by the dashed line circle 59'. In consequence, the apparent position and distance to the target are misinterpreted. The inherent error resulting from the use of the bicell 38B such as is shown in FIG. 6 can be eliminated by employing a dual bicell 38A such as is shown in FIG. 4. In this arrangement, the connections to the films 49 and 50 are reversed, relative to the connections to the films 47, 48, so that when the two pairs of signals are differenced, relative to each other, the differences in readings from the films 49, 50 and the films 47, 48 are cancelled out.

Figure 7:
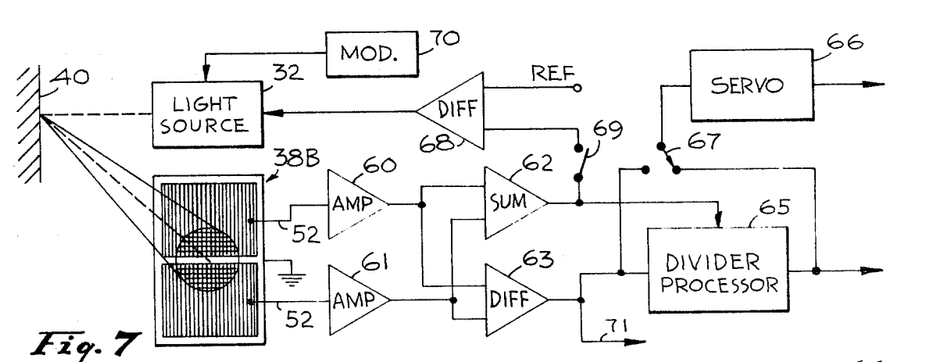
FIG. 7 is a block diagram of one particular circuit arrangement in accordance with the invention utilizing the device of FIG. 6.
Figure 8:
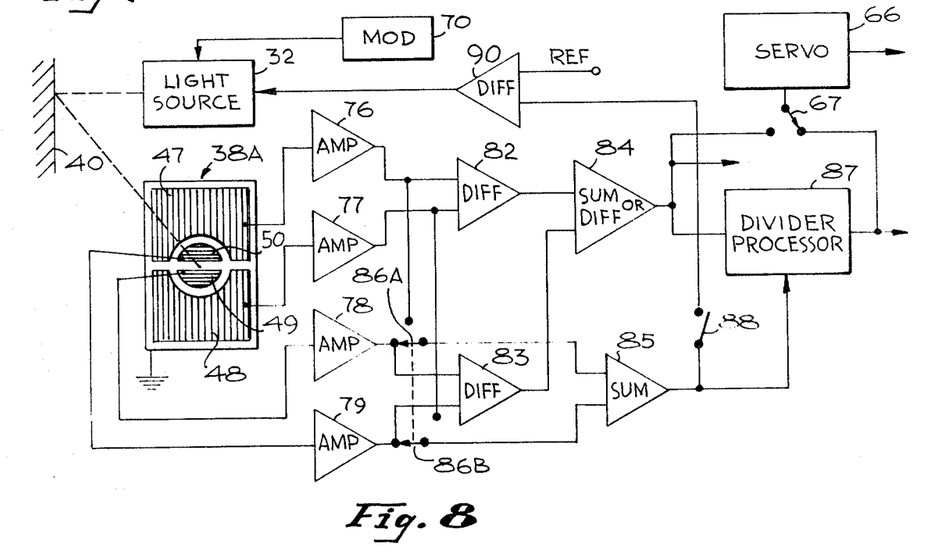
FIG. 8 is a block diagram of another particular circuit arrangement in accordance with the invention utilizing the device of FIG. 4.

Particular circuitry in accordance with the present invention is shown in FIGS. 7 and 8 to provide operating systems for various purposes. FIG. 7 illustrates circuitry in accordance with the invention utilizing a bicell 38B such as is depicted in FIG. 6 having output leads 52 connected to the separate inputs of respective amplifiers 60 and 61. Signals from the amplifiers 60 and 61 are applied to a summing stage 62 and a difference stage 63. The outputs of the stages 62 and 63 are applied to a divider processor 65 which may include a ratio network and automatic gain control circuitry (AGC) as is known in the art. The circuit of FIG. 7 also represents a light source 32 connected to be controlled in intensity by a difference stage 68 responsive to a reference signal level. One input of the difference stage 68 may be connected to the output of the summing stage 62 by a switch 69 for a particular mode of operation. A modulator stage 70 is shown connected to the light source 32 for providing modulation of the projected light beam if desired. A servo stage 66 is shown for optional connection via a switch 67. The output of the stage 66 may be applied to the master control 28 to control the Z traverse 26 (FIG. 2) in response to null signals from the control/indicator stage 14 (FIG. 1). The servo stage 66, when used, may be connected to the output of the divider processor stage 65 or 87, or alternatively may be connected to the difference stage 63 or 84. With the servo 66 in use, a deadband light may be included in the control/indicator stage 14 (FIG. 1) to indicate when the null position of the unit is within an acceptable range.

The operation of systems in accordance with the present invention may be described in terms of the circuit arrangement represented in FIG. 7. Let the operating parameters be defined as follows:

$K_1, K_2$ = gain of amplifier stages 60, 61 respectively
$K_{01}, K_{02}$ = gain of the bicell films 58, 59 respectively
$k$ = target reflectivity
$M$ = total radiated power
$P_1$ = transmitter efficiency
$P_2$ = receiver efficiency
$A_1, A_2$ = illuminated bicell areas of films 58, 59 respectively Then $$E_{sum} = M P_1 k P_2 (K_1 K_{01} A_1 + K_2 K_{02} A_2) \quad (1)$$

$$E_{dif} = M P_1 k P_2 (K_1 K_{01} A_1 - K_2 K_{02} A_2) \quad (2)$$

The scale factor of the amplifiers 60, 61 may be made equivalent and stable to any required tolerance, dependent upon the choice of operational amplifier and summing resistors. The bicell gain for both sides will be equal for materials which are symmetrical across the measurement spot as a result of the manufacturing process employed by which both films are laid down together. Therefore, $K_1 = K_2 = K$ and $K_{01} = K_{02} = K_0$. This permits simplification of equations (1) and (2) as follows:

$$E_{sum} = MP_1 k P_2 K K_0 (A_1 + A_2) \quad (3)$$

$$E_{diff} = MP_1 k P_2 K K_0 (A_2 - A_2) \quad (4)$$

The divider processor 65 is arranged to divide $E_{diff}$ by $E_{sum}$ and effectively removes the large scale factor changes associated with the products indicated in equations (3) and (4). The result eliminates the product $MP_1 k P_2 K K_0$ and provides the following result:

$$E_{diff}/E_{sum} = (A_1 - A_2)/(A_1 + A_2) \quad (5)$$

Thus only the ratio of illuminated areas is significant; symmetrical compression or elongation is not critical. The large errors normally associated with target reflectivity and target distance are removed by the linearization process of the circuitry of FIG. 7 as represented by equation (5).

The error described for the conventional bicell 38B in connection with the discussion of FIG. 5 may be eliminated by zeroing the cell output circuitry so as to make $A_1 = A_2$ for the center position. In this fashion, a symmetrical reading may be developed which is linear and is accurately related to target motion over the linear measurement range. Such a method is theoretically exact and is satisfactory in most fixed applications, especially where mechanical distance calibration may be performed. The divider processor may be replaced by an AGC network for limited conditions, such as in an analog output system, and where increased errors are permissible. Because only the ratio of the illuminated areas is important, the sum and difference signals developed in the stages 62 and 63 may be automatically or manually gain-normalized to optimize the divider dynamic range.

The circuit of FIG. 7 may be operated in a feedback processor mode by closing the switch 69 and taking the output from the lead 71 which is connected directly to the output of the difference stage 63. When operated in this mode, a number of advantages are achieved. This arrangement eliminates the need for a high accuracy divider such as is included in the divider processor stage 65. It provides a wide dynamic range, thus enabling the system to measure a wide range of target materials automatically while maintaining high accuracy of measurement, which is is difficult with an analog divider alone.

With the switch 69 closed, the output of the summing stage 62 is applied to the difference amplifier 68 for comparison with a fixed light source reference signal. The feedback through the optical coupling from the light source 32 via the target 40 and the electrical circuitry constrains the signal $E_{sum}$ from the output of the summing stage 62 to equal a constant. With the large open loop scale factor variation of the optical gain removed, the distance signal can be read directly from the difference amplifier 63 as:

$$E_{diff} = K(A_1 - A_2) \quad (6)$$

This particular arrangement also exhibits significant advantages from the viewpoint of internal calibration. Because the divider stage 65, the major source of scale factor error in the system, has been eliminated and the optical gain is dependent on only a few precision resistors, internal calibration is not necessary.

Further operational advantages, however, may be achieved by use of a hybrid feedback/divider processor utilizing the circuitry of FIG. 7 with the switch 69 in the closed position and the output being taken from the divider processor 65. The feedback processor portion of the circuit operates at a constant signal-to-noise ratio where there is a constant level of ambient noise. The wide dynamic range or latitude of distance, angle and target material results in a low signal-to-noise ratio for all materials if the feedback processor is utilized solely for compensation. However, large gain errors result if the divider processor 65 is utilized as sole compensation in the circuit with the switch 69 in the opened condition. Combination of the two portions of the system with the switch 69 closed and the output being taken from the divider processor 65 permits optimization for a specified target material. Any increased return is compensated for by the feedback processor, and decreased return is compensated by the divider processor 65. This results in a greatly increased and constant signal-to-noise ratio for a specified material. Moreover, the hybrid arrangement provides increased bandwidth, an important capability when the system is used for scanning, and also optimizes the dynamic range by providing for scale factor control from the divider processor.

The various modes of operation for the circuit shown in FIG. 7 compensate for variations in scale factor which result from different target materials and for the variation which results when target distance is changed. These circuit modes perform satisfactorily over $\pm 90°$ for a perfectly hemispherical scatterer as the target, and will work over a reduced range for non-hemispherical reflector depending on the desired error bounds. The problem associated with non-hemispherical (or directional) reflectors is the resultant gradient (variation of light intensity) across the spot, as described in connection with the discussion of FIGS. 5 and 6. For the bicell of configuration 38B of FIG. 6, the problem has been minimized by overall probe design. Referring to FIG. 3, the diameter of the receiver lens 36 is minimized with the limiting dimension being determined by the minimum detectable electronic signal from the detector 38. In this design the ambient light generated noise is reduced by the same amount as the signal is reduced, and hence does not affect the optimization.

However, an improved detector configuration in the form of the dual bicell 38A as shown in FIG. 4 provides more dramatic improvement with respect to this problem by achieving a compensation of the gradient error. The dual bicell 38A of FIG. 4 may be compared to the normal bicell 38B of FIG. 6 in that both have similar, relatively large active areas, 47 and 48 in FIG. 4 and 57 and 58 in FIG. 6. In addition, the dual bicell 38A of FIG. 4 has two more active areas 49 and 50 which constitute a second bicell whose principal purpose is gradient compensation. The out-of-focus spot of reflected light from the target illuminates all of the active areas 49 and 50 for the entire linear dynamic range. As a result, active areas 49 and 50 are independent of target position (within the linear sensing range) and therefore provide a signal which is proportional only to the gradient signal when the two areas are differenced.

Circuitry in accordance with the invention utilizing the dual bicell detector of FIG. 4 is illustrated in block diagram form in FIG. 8. In this circuit, a plurality of input or pre-amplifiers 76, 77, 78 and 79 are connected respectively to the areas 47, 48, 49 and 50 of the detector 38A. The outputs of the amplifiers 76 and 77 are applied to a difference stage 82 while the outputs of the amplifiers 78 and 79 are applied to another difference stage 83. The resulting difference outputs of the two stages 82 and 83 are then applied to a stage 84 which may be either a suming stage or a difference stage. Another summing stage 85 is connected to receive input signals via switches summing stage and 86B, ganged together, from either the amplifiers 78, 79 or the amplifiers 76,77. The outputs of the stages 84 and 85 are applied to a divider processor 87 from whence the output of the system may be taken as a linearized output. Alternatively, a separate output for the system is provided at the output of the stage 84 for use in the feedback processor mode in conjunction with the closure of the feedback path via the switch 88 which connects the output of the summing stage 85 to the input of a difference amplifier 90 for comparison with a light source reference signal to control the light source 32 in a manner similar to that already described with respect to the circuit of FIG. 7.

In the operation of the circuit of FIG. 8 in the divider processor mode (switch 88 open and circuit output taken from the divider processor 87), the difference signal at the output of the difference stage 82, derived from a comparison of the signals from active areas 47 and 48, is proportional to the distance from the target and is utilized for distance measurements. A second difference signal is developed at the output of the difference stage 83 from a comparison of the signals generated in the active areas 49 and 50. The sum signal, shown developed by the summing stage 84 from the outputs of the amplifiers 78 and 79 may, if desired, be derived from the active areas 47 and 48 via amplifiers 76 and 77. However, the optimum connection is from the active areas 49 and 50 via amplifiers 78 and 79, as the spot illumination is then averaged over a smaller area and in the same area where the difference signal (for distance) is generated.

The operation of the arrangement of FIG. 8 is similar to the operation of the corresponding circuitry of FIG. 7, except for the effect of the compensating signals developed by the additional active areas 49 and 50. The gradient signal from active areas 49 and 50 is summed in appropriate phase to cancel the gradient signal that exists in the difference signal from active areas 47 and 48. The gradient compensation results in a null repeatability independent of target reflectivities over a wide angular range. The same equations developed with respect to the circuitry of FIG. 7 are applicable in the operation of the circuitry of FIG. 8.

There are many possible variations other than the basic processor disclosed herein for related circuit configurations. The operation of these processor circuits is amenable to DC analog operation, modulated analog operation, incremental digital operation or whole number digital operation for example. The circuitry as depicted in FIGS. 7 and 8 is basically for DC analog operation. In such a case, the input amplifiers 60, 61 and 76-79 are low level DC amplifiers, and the sum and difference stages 62, 63 and 82, 83, 84, 86 are DC operational amplifiers. For best linearity, the input amplifiers are operated as transresistance amplifiers, although voltage amplification configurations may be employed.

A ratio or divider network in the stages 65 and 85 is desired where high accuracy or wide dynamic range is sought. An AGC network may be employed where target variations are low and reduced accuracy is permissible, and particularly in analog signal operation. The divider in such a stage may represent many possible configurations, such as servo-dividers, pulse-height/width dividers, magnetic resistance dividers, and quarter-square dividers, to name a few. These may also include automatic or manual ranging features to minimize the dynamic range of the divider. Zeroing of the equipment may be readily performed by removing the light source and nulling the difference and/or sum and/or output signal.

Modulation of the incident light beam from the associated modulator stage 70 may be employed as a simple means to reduce the sensitivity of the processor to electronic offsets and to ambient light variations. Either mechanical or electronic light modulation may be employed. Mechanical light modulation may be accomplished with a tuning fork or a spinning disc periodically interrupting or diminishing the projected light beam, for example, although either of these approaches would increase the size and weight of the probe head assembly. One advantage of such modulation is the provision of a relatively high modulation frequency, higher than would be possible by modulating the electrical drive to the light source utilizing an incandescent lamp. Lasers or mercury arc lamps are amenable to high frequency electrical modulation. With such light modulation, AC circuitry may be employed for the various amplifying the processing stages in the circuits of FIGS. 7 and 8. Demodulation of the electrical signals may take place at almost any point in the circuit, or not at all if an AC output signal is acceptable.

Moreover, various types of signal processing stages may be substituted in the circuits of FIGS. 7 and 8 in accordance with the form of the output signal which is desired. If the probes in accordance with the invention are to be employed to drive numerical control system using incremental techniques, or if a simple digital mechanization is desired, the processing electronics of the depicted circuits may be operated in a digital incremental mode. Thus, for example, analog-to-digital converters may be used instead of the input amplifiers such as 60, 61. Typical of such converters for operating with low level signals are those described in literature as voltage-to-frequency converters, quantizers, integrating digital volt meters and difunction generators. The sum, difference, and divide functions can be performed with pulse trains by pulse counting techniques. The output is then compatible with digital incremental machines and can also be converted to any desired format, thus removing the dependency of the system upon the accuracy of an analog divider. The above-described method is also applicable for the feedback and hybrid modes of operation of the circuits of FIGS. 7 and 8. Digital-to-Analog (D/A) conversion is required for the light source drive via the switch 69 or 88 if a DC reference is used. Especially attractive is the approach of using a pulse rate command for the light source 32 with a phase-locked loop to drive the light source in the feedback mode.

In one particular arrangement of a dual bicell (as depicted in FIG. 4) in accordance with the invention the following dimensions are applied (referring to FIG. 4):

| | |
|---|---|
| Vertical dimension of active areas 47 and 48 | 0.225 in. |
| Width of each active area 47, 48 | 0.175 in. |
| Spacing between active areas across center line | 0.005 in. |
| Width of active areas 49, 50 | 0.015 in. |
| Spacing between active areas 49, 50 & 47, 48 | 0.005 in. |
| Spot size | 0.150 in. diameter |

In an alternative embodiment, the above dimensions applied except that the spacing between the inner and outer active areas was 0.002 inches. Symmetry was provided across the mid-line in order that the device could be balanced electrically. The dual bicell device was fabricated in accordance with known techniques for fabricating silicon photodiode bicells of the type depicted in FIG. 6.

The structural configuration may vary from that shown, the controlling consideration being that the unit is symmetrical about a center line across the bicell. Moreover, it is desirable that the leads 52 from the inner pair of active areas 49, 50 be led out between the active areas 47, 48, as indicated in FIG. 4.

As described hereinabove, a typical scanning operation involves a repetitive traversal of the field within a plane normal to the projection axis (which is usually the Z axis). An alternative mode of operation for the systems of FIGS. 7 and 8 involving the servo stage 66 utilizes the servo stage 66 to control the position of the probe 12 along the projection axis (usually the Z axis) with a Z axis readout being provided from the Z traverse stage 26 and the master control stage 28 (FIG. 2) as the output information. The system is set to maintain a fixed distance of the probe from the surface being scanned and the servo 66 operates in conventional fashion to reduce the error signal detected relative to the reference distance. The instantaneous error signal may be displayed on a null indicator in the control/indicator stage 14 (FIG. 1) which also includes a null indicator light or other signalling device (deadband signal) to audibly or visually signal an operator when the system is operating within a preselected threshold range of the true zero null position. Such a deadband signal may also be used to control the output information signal path via a gate, for example, to block all Z position signals corresponding to null indications outside the preselected threshold range, if desired.

Arrangements in accordance with the invention as described hereinabove are effective in performing non-contact measurements of a design model configuration or of other devices for which point by point measurements are desired to provide digital output signals designating the locations of the various points making up the model in terms of Cartesian coordinates. Systems in accordance with the invention are particularly useful by virtue of the precise and repeatable measurements which may be made without touching or affecting the surface of the model being measured. These systems also permit data collection activities to be automated with a corresponding decrease in the time required to perform measurements. In addition to the uses described for the invention, embodiments thereof are widely applicable for other purposes, such as centerless grinder monitoring, drill and mill control, sheet stock thickness gaging, fixed tool checking, quality control, visual timing operations, and the like.

Although there have been described above specific arrangements of a non-contacting optical probe in accordance with the invention for the purpose of illustrating the manner in which the invention may be used to advantage, it will be appreciated that the invention is not limited thereto. For example, although the invention has been generally described in the context of use of a silicon photovoltaic detector, the same mechanization may be employed with photovoltaic detectors of other materials, photo-conductive detectors and photoemissive detectors. Accordingly, any and all modifications, variations or equivalent arrangements which may occur to those skilled in the art should be considered to be within the scope of the invention.

What is claimed is:

1. An optical scanning system for providing distance measurements to a target object being scanned without physical contact therewith comprising:
   a light source for directing light at a target;
   a photodetector for developing electrical signals in accordance with reflected light received from said target, said photodetector being divided into two pairs of distinct active areas with each active area developing an electrical signal in accordance with the portion of the reflected light incident thereon;
   electrical circuitry connected to said photodetector for developing comparison signals from the individual active area electrical signals;
   means for deriving gradient signals from each pair of said pairs of active areas; and
   means for processing said derived signals and said comparison signals to provide an output signal indicative of the distance from the photodetector to the target.

2. A system in accordance with claim 1 further including an indicator responsive to said output signal and calibrated in units of linear measurement for directly indicating said distance in said units.

3. An optical scanning system for providing distance measurements to a target object being scanned without physical contact therewith comprising:
   a light source for directing light at a target;
   a photodetector for developing electrical signals in accordance with reflected light received from said target, said photodetector having first and second pairs of separate active areas, the areas of each pair being substantially equal in extent and symmetrically located thereon, each active area developing an electrical signal in accordance with the portion of reflected light incident thereon;
   means for directing the reflected light in a beam to be substantially equally shared by the first pair of active areas at a predetermined reference distance from the target;
   electrical circuitry connected to said photodetector for developing comparison signals from the individual active area electrical signals; and
   means for processing said comparison signals to provide an output signal indicative of the distance from the photodetector to the target.

4. A system in accordance with claim 43 wherein said light directing means is positioned to direct a reflected light beam off the center of said first pair of active areas for distances between the cell and the target which are different from said reference distance.

5. A system in accordance with claim 4 wherein said second pair of active areas is positioned within the area encompassed by said first pair so as to receive reflected light from the target incident throughout the extent of the active areas of said second pair for all operating positions of said photodetector and light source.

6. A system in accordance with claim 43 wherein said electrical circuitry comprises comparison means connected to receive the signals from the respective pairs of active areas of the photodetector and provide a first comparison signal which is the sum of electrical signals from one pair and a second comparison signal which is the difference between the signals from said one pair of active areas.

7. A system in accordance with claim 6 wherein said processing means includes a signal dividing circuit for developing an output signal which is equal to the second comparison signal divided by the first comparison signal.

8. A system in accordance with claim 6 further including additional comparison means for developing a difference signal from the signals received from the other pair of active areas and modifying the first comparison signal in order to compensate for distance errors in said first comparison signal.

9. A system in accordance with claim 6 wherein said processing means includes automatic gain control circuitry for controlling the amplitude of the difference signal in accordance with the amplitude of the sum signal.

10. An optical scanning system for providing distance measurements to a target object being scanned without physical contact therewith comprising:
    a light source for directing light at a target;
    a photodetector for developing electrical signals in accordance with reflected light received from said target, said photodetector being divided into two pairs of distinct active areas with each active area developing an electrical signal in accordance with a portion of the reflected light incident thereon;
    electrical circuitry connected to said photodetector for developing comparison signals from the individual active area electrical signals;
    means for processing said comparison signals to provide an output signal indicative of the distance from the photodetector to the target; and
    means for controlling the intensity of the light source relative to a fixed reference level.

11. A system in accordance with claim 44, further including a difference amplifier for driving the light source from the reference level.

12. A system in accordance with claim 11 further including circuit means for applying the first comparison signal to the input of said difference amplifier to develop a feedback loop for controlling the intensity of the light source in accordance with the sum of the electrical signals developed by one pair of active areas.

13. A system in accordance with claim 12 further including means for providing a system output signal directly from said other comparison means.

14. A system in accordance with claim 4 further including traverse means for controlling relative motion between the photodetector and the target object.

15. A system in accordance with claim 14 wherein said processing means comprises a servomechanism responsive to the difference between the active areas of said detector illuminated by the light beam in order to control the traverse along a selected axis to minimize said difference.

16. A system in accordance with claim 15 wherein said processing means further includes a signal dividing circuit for driving the servomechanism in accordance with the ratio of the difference divided by the sum of the detector signals. the difference divided by the sum of the detector 17. A system in accordance with claim 1 further including a deadband signal for indicating when the position of the photodetector is within a preselected threshold range of its true position.

18. A system in accordance with claim 7 wherein said output signal is approximately equal to $(A_1 - A_2)/(A_1 + A_2)$ where $A_1$ and $A_2$ correspond to the illuminated portions of said first pair of active areas respectively.

19. A system in accordance with claim 1 wherein said light source comprises an incandescent lamp.

20. A system in accordance with claim 1 wherein said light source comprises an arc lamp.

21. A system in accordance with claim 1 wherein said light source comprises a laser beam.

22. A system in accordance with claim 1 further including means for modulating said light directed at said target.

23. A system in accordance with claim 22 wherein said modulating means comprises means for varying the intensity of the light from the light source.

24. A system in accordance with claim 22 wherein said modulating means comprises means for interrupting said light beam periodically.

25. A system in accordance with claim 43 wherein said second pair of active areas is centrally located within a central aperture within the first pair of active areas, and further including electrical leads connected to each of said separate active areas.

26. A system in accordance with claim 25 further including individual amplifying means respectively connected to said electrical leads for amplifying each of the signals from the separate active areas individually, a pair of difference amplifiers in parallel, the two difference amplifiers being connected to develop difference signals between separate pairs of the signals from the individual amplifiers, a sum amplifier connected to provide a sum signal corresponding to the sum of one pair of amplifier outputs, another amplifier connected to receive the outputs from the pair of difference amplifiers and to provide a signal which is a comparison of said difference signals, and a processor connected to receive both of said last-mentioned signals and arranged to process the comparison signal under the control of the sum signal.

27. A system in accordance with claim 1 further including an optical filter positioned between the photodetector and the target for reducing the extent of interfering light at the photodetector.

28. A system in accordance with claim 27 wherein said optical filter is arranged to block ambient light from reaching the photodetector.

29. A photodetector cell having a plurality of separate active areas for developing separate electrical signals in response to light incident thereon comprising:
- a base;
- a first pair of separate active areas symmetrically arrayed on said base and having a central aperture located therein;
- a second pair of separate active areas symmetrically positioned on said base and located within the aperture in the first pair of active areas; and
- a plurality of electrical leads, respectively connected to the individual active areas of said first and second pair.

30. Apparatus in accordance with claim 29 wherein said first pair of active areas cover a substantially rectangular portion of said base with a substantially circular central aperture and a narrow space extending through said central aperture from side to side of said rectangular portion to separate the two active areas into substantially equal areas.

31. Apparatus in accordance with claim 30 wherein each of said separate active areas of said first pair is approximately .225 inches across and approximately 0.175 inches wide, excluding the portion of the central area.

32. Apparatus in accordance with claim 31 wherein said second pair of active areas are each approximately semicircular in shape and approximately 0.015 inches in diameter.

33. Apparatus in accordance with claim 32 wherein the spacing between the respective pairs of active areas is approximately 0.005 inches.

34. An optical scanning system for providing distance measurements to a target object being scanned without physical contact therewith comprising:
- a light source for projecting light toward a target;
- a photodetector for developing electrical signals in accordance with reflected light received from said target, the photodetector being divided into a plurality of active areas with each active area developing an electrical signal in accordance with the portion of the reflected light incident thereon;
- electrical circuitry connected to the photodetector for developing comparison signals from the individual active area electrical signals;
- means for controlling the light source from a reference signal level; and
- means comprising a feedback loop for applying one of said comparison signals to said controlling means to vary the level accordingly.

35. A system in accordance with claim 34 further including traverse means for controlling relative motion between the photodetector and the target object.

36. A system in accordance with claim 35 wherein said electrical circuitry further comprises a servomechanism responsive to the difference between the photodetector signals in order to control the traverse along a selected axis to minimize said difference.

37. A system in accordance with claim 36 wherein said electrical circuitry further includes a signal dividing circuit for driving the servomechanism in accordance with the ratio of the difference divided by the sum of the detector signals.

38. A system in accordance with claim 34 further including a deadband signal for indicating when the position of the photodetector is within a preselected threshold range of its true position.

39. A system in accordance with claim 34 wherein said applied signal corresponds to the sum of the signals of the active areas of the photodetector.

40. A system in accordance with claim 34 further including means for applying another of said comparison signals directly to the system output for utilization by associated apparatus.

41. A system in accordance with claim 34 further including a divider processor connected to receive said comparison signals and arranged to provide a ratio of one of said comparison signals divided by the other as an output signal.

42. A system in accordance with claim 41 wherein said output signal is approximately equal to $(A_1 - A_2)/(A_1 + A_2)$ where $A_1$ and $A_2$ correspond to the illuminated portions of the separate active areas respectively, and where $A_1 + A_2$ is substantially constant within the operating range of the system.

* * * * *

UNITED STATES PATENT OFFICE
CERTIFICATE OF CORRECTION

Patent No. 3,679,307  Dated July 25, 1972

Inventor(s) Robert Martin Zoot et al

It is certified that error appears in the above-identified patent and that said Letters Patent are hereby corrected as shown below:

Column 1, line 9, cancel "such as numerically"; column 2, line 7, "projectionlens" should read -- projection lens --; line 10, "considerably" should read -- considerable --; line 17, "Calf.," should read -- California --; column 8, line 60, "summing stage" should read -- 86A --; column 9, line 66, "the", first occurrence, should read -- and --; column 10, line 27, "ar eas" should read -- areas --; column 12, lines 67-68, cancel "the difference divided by the sum of the detector"; column 13, line 41, cancel "photodetector", second occurrence; column 14, line 2, ".225" should not be in boldface type and should appear -- 0.225 --.

Signed and sealed this 19th day of December 1972.

(SEAL)
Attest:

EDWARD M. FLETCHER, JR.　　　　　　　ROBERT GOTTSCHALK
Attesting Officer　　　　　　　　　　Commissioner of Patents